Feb. 14, 1961 G. SCHOHAN 2,972,100

HALF-WAVE MAGNETIC AMPLIFIER CIRCUITS

Filed July 12, 1957

INVENTOR.
GEORGE SCHOHAN

BY

ATTYS 2,972,100

HALF-WAVE MAGNETIC AMPLIFIER CIRCUITS

George Schohan, 1825 T St. NW., Apt. 501, Washington, D.C.

Filed July 12, 1957, Ser. No. 671,675

5 Claims. (Cl. 323—89)

Figure 1:
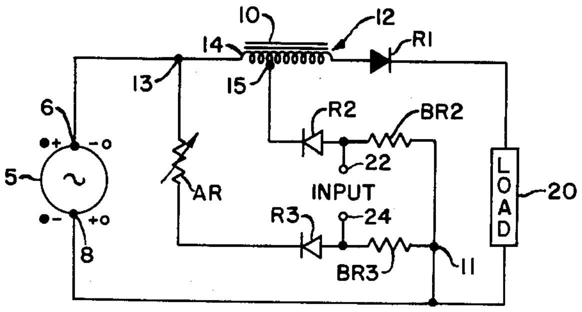

(Granted under Title 35, U.S. Code (1952), sec. 266)

The invention described herein may be manufactured and used by or for the Government of the United States of America for governmental purposes without the payment of any royalties thereon or therefor.

The present invention relates generally to new and improved half-wave magnetic amplifiers and more particularly to single-ended half-wave magnetic amplifiers in which the control signal source is isolated from the amplifier circuit during the power half-cycles by means of a novel input control circuit.

Although half-wave magnetic amplifiers have been used extensively in instrumentation systems requiring a high speed of response, gain has been sacrificed in order to take advantage of the desirable high speed of response of such circuits. Due to the fact that conventional half-wave magnetic amplifiers require a series control resistor of the order of 10,000 ohms in the input control circuit in order to prevent loading of the amplifier and control signal source caused by the introduction of circulating currents in the control circuit during the power half-cycles, a major portion of the control signal is lost by dissipation in this resistor. Consequently, it has been necessary to employ several half-wave stages in cascade in order to obtain the necessary output for instrumentation control.

Those concerned with the development of half-wave magnetic amplifiers have long recognized the need of a control circuit which provided a high input impedance during the power half-cycles and negligible input impedance during the reset, or control, half-cycles. One manner of accomplishing this in half-wave magnetic amplifiers of the bridge type is by the biased-rectifier technique disclosed in the copending application of Joseph J. Suozzi, Serial No. 671,673, filed July 12, 1957, assigned to the U.S. Government. In the aforesaid application, a pair of serially connected control windings are interconnected in series circuit relation with the rectifiers of the bias circuit, the bias circuit rectifiers being similarly phased relative to the A.C. power supply source but connected in polarity opposition in the series circuit relation with the control windings. In this manner, conduction of the rectifiers during the reset, or bias, half-cycles causes the rectifiers to become negligible impedance devices and enables the control signal to be fully impressed on the control windings. However, on the power half-cycles, the bias-circuit rectifiers are non-conductive, and at least one of these rectifiers is phased to present its back impedance to the control signal source, thereby isolating the control source from the amplifier circuit and hence preventing the existence of undesirable and detrimental circulating currents.

Although half-wave bridge magnetic amplifiers have general utility in servo instrumentation, it is often desired to employ smaller magnetic amplifier circuits which do not occupy much space. The present invention is directed to innovations of the aforedescribed biased-rectifier techniques for application to single-ended half-wave magnetic amplifiers and include circuitry which, although basically operating on the same principle disclosed in the Suozzi application, differ materially therefrom in circuit components and circuit arrangement. Utilization of the biased-rectifier technique in single-ended magnetic amplifiers as herein taught results in amplification factors exceeding those of conventionally designed single-ended magnetic amplifiers.

With the foregoing in mind, it is an object of the present invention to provide new and improved single-ended half-wave magnetic amplifier arrangements.

Another object of the invention is the provision, in single-ended half-wave magnetic amplifiers, of a control circuit arrangement which isolates the control source from the amplifier during the power half-cycles thereof.

A further object is to provide single-ended half-wave magnetic amplifier arrangements having improved amplification characteristics.

Yet another object is the provision of a single-ended half-wave magnetic amplifier in which a portion of the load winding serves to function both as a control winding and bias winding.

A primary object of the present invention is to provide, for a single-ended half-wave magnetic amplifier, a control circuit characterized by a high input impedance during the power half-cycles of the amplifier and negligible input impedance during the reset half-cycles thereof.

An essential object of the invention is the inclusion of the bias-circuit rectifiers in series relation with the control source and phased in polarity opposition in the series relation to thereby present the back impedance of at least one of the rectifiers to the control source during the non-conductive half-cycles of the bias circuit.

Figure 2:
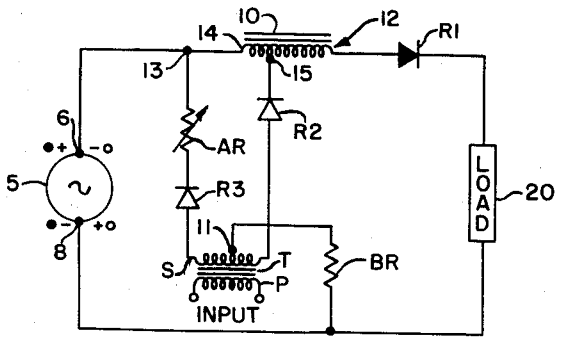

Other objects and many of the attendant advantages of this invention will be readily appreciated as the same became better understood by reference to the following detailed description when considered in conjunction with the accompanying drawings in which like reference characters designate like or corresponding parts throughout the figures thereof and wherein:

Fig. 1 illustrates a single-ended half-wave magnetic amplifier which is responsive to either an A.C. or D.C. control signal and which incorporates the novel control circuit of the present invention; and Fig. 2 is a modification of Fig. 1 incorporating a transformer which renders the amplifier sensitive only to A.C. control signals.

Referring now to the drawing, there is shown in Fig. 1, which illustrates a preferred embodiment of the invention, a single-ended half-wave magnetic amplifier connected in closed series circuit with a load 20 and an A.C. power supply source 5, the amplifier consisting of a saturable core reactor 10 having wound thereon a load winding, indicated generally as 12, connected in series with a rectifier R1 which is phased to pass the alternate half-cycles of source 5 when terminal 6 is positive (black polarities). The portion of the load winding 12 between tap 15 and terminal 13, and designated 14, serves to function as both a control winding and a reset winding, as will become more clearly apparent hereinafter.

In order to facilitate an understanding of the operation of the circuits of Figs. 1 and 2, the graphical symbols are presented in a manner to indicate that the black rectifiers are conductive on the black polarities of source 5 while the white rectifiers are conductive on the white polarities of source 5.

Returning now to Fig. 1, bias or reset current for establishing the reference flux level in reactor 10 is applied to winding 14 through a pair of substantially equally rated series branch circuits. One of the series branch circuits consists of bias resistor BR2 and rectifier R2 serially connected between terminal 11 and tap 15; whereas the other branch circuit serially includes bias resistor BR3, rectifier R3 and variable resistor AR connected between terminals 11 and 13, resistor AR being adjustable to compensate for any parametric dissimilarities between rectifiers R2 and R3 and between resistors BR2 and BR3, and also providing resistance equivalent to the D.C. resistance of that portion of winding 14 between tap 15 and terminal 13 thereby establish a balanced condition in the two branches. A control signal source (not shown), of either D.C. or A.C. voltage, is connected between input terminal 22 and 24.

In operation during the reset half-cycles (white polarities), only rectifiers R2 and R3 conduct; and, bias current for establishing the reference flux level, in core 10 flows from terminal 8 of source 5 and divides at terminal 11 to flow through rectifier R3 in one branch and through rectifier R2 in the other branch and through winding 14. When rectifiers R2 and R3 are conductive, they become negligible impedance devices and are effective to present a conductive path to a control signal appearing across terminals 22 and 24, the conductive path for the control signal being defined from terminal 22 through rectifier R2, winding 14, resistor AR and rectifier R3 black to terminal 24. The control current flowing in this path and through winding 14 augments the bias current flowing through winding 14 and presets the flux level in core 10 in a manner corresponding to the magnitude of the control signal, as is well known by those skilled in the art. From the foregoing, it is evident that rectifiers R2 and R3 are effective to present negligible impedance to the control source during the reset half-cycles, as has been highly desired but heretofore unattained in the art.

However, on the power half-cycles of source 5 (black polarities), only rectifier R1 conducts to enable core 10 to saturate and fire at a point determined by the flux level preset during the reset half-cycles to deliver to load 20 an output which is correlative in magnitude to the amplitude of the control signal. Meanwhile, rectifiers R2 and R3 are non-conductive and hence display their full back impedance. Thus, due to their polarity opposition arrangement, in the series circuit relation with the control source, either rectifier R2 or rectifier R3 will present its back impedance to the control source during the power half-cycles, the rectifier presenting the back impedance being dependent on the polarity of the control signal. For example, if the control signal is positive at terminal 22 and is attempted to be traced therefrom through rectifier R2 in series with winding 14 and resistor AR, it is noted that rectifier R3 is poled to present its back impedance to the control current and consequently blocks conduction of control current. For control signals of opposite polarity, rectifier R2 presents the high back impedance which prevents conduction of the control signal current. Not only do rectifiers R2 and R3 block conduction of control signal current during the reset half-cycles, but they are also effective to isolate the control circuit from the amplifier by preventing conduction therethrough of any circulating currents in the control circuit, this being attained during their non-conductive condition by virtue of their polarity opposition in the series circuit relation with the control source. Therefore, the bias rectifiers R2 and R3 are effective to present a high input impedance to the control source during the power half-cycles of the amplifier. It is to be noted that the circuit arrangement of Fig. 1 is adapted to be responsive to either a D.C. or an A.C. control signal.

If it is desired, the circuit of Fig. 1 may be modified to be responsive only to A.C. control signals merely by utilizing a transformer with a center-tapped secondary to which is connected a bias resistance. Such an arrangement is shown in Fig. 2 which is similar to Fig. 1, like parts having corresponding reference characters, with the exception that the primary P of transformer T is connected to receive the control signal applied to terminals 22 and 24 and a single bias resistor BR connects terminal 8 of source 5 to the center-tap 11 of secondary winding 5. It is to be noted that center-tap 11 functionally corresponds to a current divider as does terminal 11 in Fig. 1, hence the similarity of reference numeral.

The rectifiers R2 and R3 of the circuit of Fig. 2 operate in substantially the same manner as they do in Fig. 1 in accomplishing their functions of presenting a high back impedance during the power half-cycles and negligible impedance during the reset half-cycles. The control signal, induced in secondary winding S from primary winding P during the reset half-cycles, flows through the closed series circuit formed by winding S, rectifier R2, winding 14, resistor AR and rectifier R3, it being noted that rectifiers R2 and R3 are negligible impedance devices during the reset half-cycles.

In addition to providing the desired input impedance of the novel control circuit of Figs. 1 and 2 is that, since rectifiers R2 and R3 become negligible impedance devices, it is possible for the amplifier to be sensitive to control signals of very small magnitude.

Obviously many modifications and variations of the present invention are possible in the light of the above teachings. It is therefore to be understood that, within the scope of the teachings herein and the appended claims, the invention may be practiced otherwise than as specifically described.

What is claimed and desired to be secured by Letters Patent of the United States is:

1. In combination, a source of alternating current; a load; a single-ended half-wave magnetic amplifier connected in closed series circuit relation with said source and load and including a load winding for passing current through said load on alternate half-cycles of one polarity from said source; a bias circuit interconnecting said source with a portion of said load winding and including a pair of rectifiers similarly poled with respect to said alternating current source for passing half cycles of a polarity opposite to said one polarity from said source through only said portion of said load winding to thereby establish reference flux level in said amplifier; connecting means for connection to a source of control signal current; and an input control circuit including in closed series circuit relation said connecting means, said pair of rectifiers and said load winding portion, said pair of rectifiers being connected in polarity opposition in said series circuit relation.

2. The combination of claim 1, wherein said translating means comprises a transformer having a primary winding connectable to a source of control signal current and a secondary winding connected in said series circuit relation.

3. In a single-end half-wave magnetic amplifier having reactor means with a load winding thereon energized from an alternating current source and operable to produce and output correlative with the magnitude of a control signal applied thereto from a control source; a combined control and bias circuit comprising the combination of reset circuit means interconnecting said source with a portion of said load winding and formed by a pair of parallel branch circuits each including a respective rectifier, said rectifiers being similarly phased relative to said source so as to be simultaneously conductive on the same alternate half-cycles of said alternating current source to thereby apply reset current to said portion of said load winding, and a control current connecting circuit connectable to a control source and including in series circuit relation said load winding portion and said rectifiers, said rectifiers being connected in polarity opposition in said series circuit relation.

4. The circuit of claim 3, wherein said connecting circuit includes a transformer having a primary winding connectable to a control source and a secondary winding serially included in said series circuit relation.

5. In a single-ended half-wave magnetic amplifier having reactor means with load winding means thereon energized from an alternating current source, the combination comprising a pair of terminals for connection to a control signal source, and an input circuit interconnecting said alternating current source with a portion of said load winding means and being connected to said terminals for receiving control current from said control source to thereby establish respectively therefrom the reference and control flux levels in said reactor means, said input circuit including in series circuit relation said portion of said load winding means and a pair of rectifiers, said rectifiers being similarly phased relative to said alternating current source and in polarity opposition in said series circuit relation.

References Cited in the file of this patent

FOREIGN PATENTS 1,112,349 France ---------------- Nov. 9, 1955

OTHER REFERENCES

"Flux Preset High-Speed Magnetic Amplifiers," by C. B. House, AIEE Transaction, vol. 72, part I, 1953, pp. 728–735.

"A Transient-Controlled Magnetic Amplifier," Navord Report #4258, by G. Schohan, U.S. Naval Ordnance Laboratory, White Oak, Md., pp. 1, 2 and 11, Mar. 29, 1956.